United States Patent
Eick et al.

(10) Patent No.: US 9,823,372 B2
(45) Date of Patent: Nov. 21, 2017

(54) CONTROLLED SPACED STREAMER ACQUISITION

(71) Applicant: CONOCOPHILLIPS COMPANY, Houston, TX (US)

(72) Inventors: Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 66 days.

(21) Appl. No.: 14/800,004

(22) Filed: Jul. 15, 2015

(65) Prior Publication Data

US 2016/0018547 A1    Jan. 21, 2016

Related U.S. Application Data

(60) Provisional application No. 62/025,573, filed on Jul. 17, 2014.

(51) Int. Cl.
*G01V 1/38* (2006.01)
*G01V 1/20* (2006.01)

(52) U.S. Cl.
CPC .............. *G01V 1/3861* (2013.01); *G01V 1/20* (2013.01); *G01V 1/3808* (2013.01)

(58) Field of Classification Search
CPC ....... G01V 1/20; G01V 1/3808; G01V 1/3861
USPC .................................................... 367/15, 20
See application file for complete search history.

(56) References Cited

U.S. PATENT DOCUMENTS

| 4,538,251 | A  | * | 8/1985  | Steetle ................... G01V 1/20 367/154 |
| 6,590,831 | B1 |   | 7/2003  | Bennett et al. |
| 8,976,622 | B2 |   | 3/2015  | Hillesund et al. |
| 2009/0213693 | A1 | * | 8/2009 | Du .......................... G01V 1/282 367/73 |
| 2011/0286302 | A1 |   | 11/2011 | Welker et al. |
| 2011/0317517 | A1 | * | 12/2011 | Borresen .............. G01V 1/3808 367/21 |
| 2012/0113745 | A1 |   | 5/2012  | Eick et al. |

FOREIGN PATENT DOCUMENTS

WO    20090092025 A2    7/2009

OTHER PUBLICATIONS

International Search Report—PCT/US2015/040589, International filing date Jul. 15, 2015, Applicant ConocoPhillips Company; 1 pg.

* cited by examiner

*Primary Examiner* — Daniel L Murphy
(74) *Attorney, Agent, or Firm* — Conocophillips Company

(57) ABSTRACT

A seismic measurement system and a method of obtaining seismic measurements are described. The seismic measurement system includes a cable and a plurality of sensors disposed at a first interval along the cable. The plurality of sensors receives reflections resulting from a seismic source and each of the plurality of sensors receives the reflection corresponding with a particular subsurface location. The system also includes a controller to turn on a first set of the plurality of sensors and turn off a second set of the plurality of sensors based on an area of interest.

9 Claims, 4 Drawing Sheets

CONTROLLED SPACED STREAMER ACQUISITION

CROSS-REFERENCE TO RELATED APPLICATION

This application is a non-provisional application which claims benefit under 35 USC §119(e) to U.S. Provisional Application Ser. No. 62/025,573 filed Jul. 17, 2014, entitled "CONTROLLED SPACED STREAMER ACQUISITION," which is incorporated herein in its entirety.

FIELD OF THE INVENTION

The present invention generally relates to seismic streamers towed by a vessel in a marine environment. In particular, embodiments detail dynamic adjustment of spacing of seismic samples.

BACKGROUND OF THE INVENTION

Seismic streamers are towed by a vessel in a marine environment such as an ocean. Each seismic streamer includes a series of the geophones or hydrophones (receivers) arranged along its length. Each of the receivers receives the seismic signals and converts them into electrical or other signals. The receivers arranged along the seismic streamers record seismic signals resulting from a reflection of a seismic source signal transmitted into the underwater environment below the seismic streamers. The seismic source signal may originate from the vessel, for example. The seismic streamers extend behind the vessel and can be several to tens of kilometers in length. Thus, the seismic streamers are unlikely to be linear but, instead, have shapes affected by factors like wind speed, direction, and marine current, for example. The seismic streamers are typically fashioned with the receivers arranged at regular intervals along each streamer.

SUMMARY OF THE INVENTION

According to an embodiment, a seismic measurement system includes a cable; a plurality of sensors disposed at a first interval along the cable, the plurality of sensors configured to receive reflections resulting from a seismic source and each of the plurality of sensors configured to receive the reflection corresponding with a particular subsurface location; and a controller configured to turn on a first set of the plurality of sensors and turn off a second set of the plurality of sensors based on an area of interest.

According to another embodiment, a method of obtaining seismic measurements includes disposing a cable in a marine environment, the cable configured to be towed by a vessel; disposing a plurality of sensors at a first interval along the cable, the plurality of sensors configured to receive reflections resulting from a seismic source and each of the plurality of sensors configured to receive the reflection corresponding with a particular subsurface location; and controlling the plurality of sensors to turn on a first set of the plurality of sensors and turn off a second set of the plurality of sensors.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

As noted above, seismic streamers with receivers arranged along the length of the streamer (cable) can record seismic reflections produced based on a seismic source. The received reflections (reflection seismology) provide information about the subsurface environment in a similar way as sonar or echolocation, for example. The information may be used to generate a three-dimensional (3D) mapping of the subsurface environment that includes details such as, for example, density of the rock. Regular sampling using all the receivers may be adequate near to the source, but with increasing distance from the source, the bandwidth of the source wavelet decreases and the detailed regular sampling may no longer be necessary to adequately recover the signal. Fewer samples would also reduce the bandwidth required to recover the data from the streamers. That is, when the receivers arranged along the seismic streamer are too closely spaced, the density of data sampling that result can be prohibitive for timely analysis and processing. Furthermore, the additional data may not improve the quality of the final image and may even detract in resolution in same cases. On the other hand, when a particularly interesting subsurface feature is encountered, a more densely sampled area (receivers spaced closer together) may be desirable. For example, more sampled may be needed for structures that are dome like. Embodiments of the systems and methods described herein relate to dynamic adjustment of sample spacing to address both the need to reduce superfluous data and the need to increase sampling density in some cases.

Figure 1:
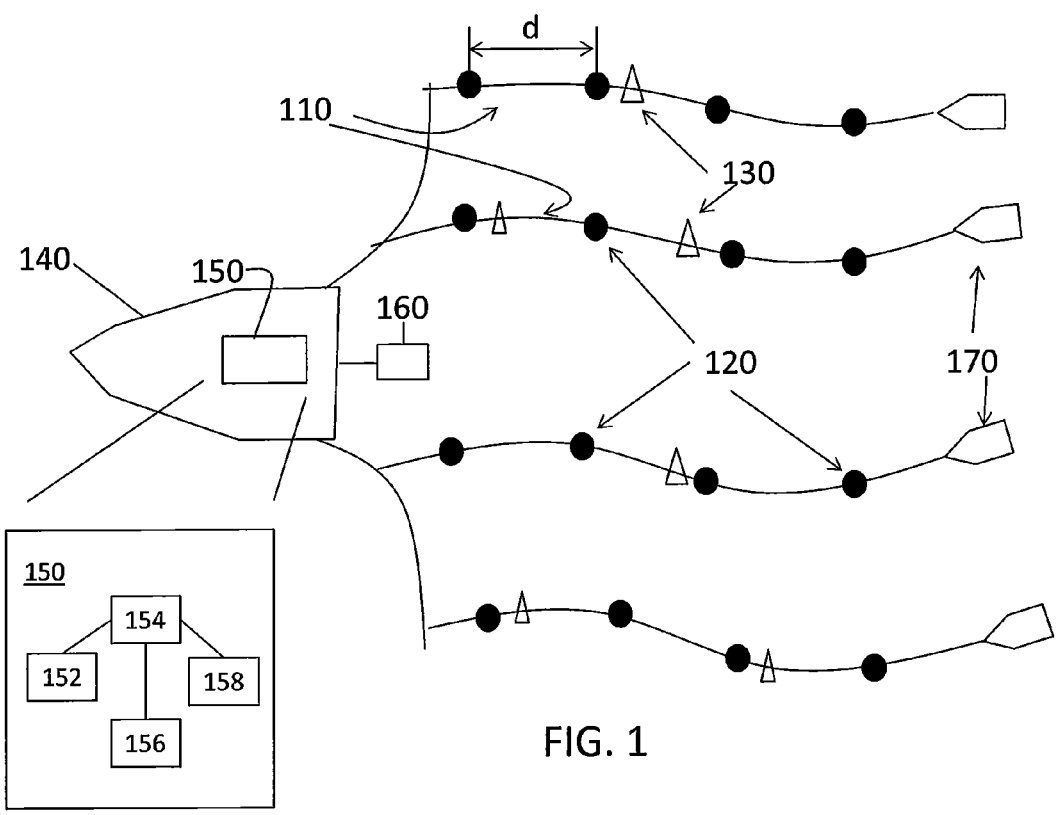
FIG. 1 is a simplified overhead view of a vessel towing a plurality of seismic streamers according to an embodiment of the invention.

FIG. 1 is a simplified overhead view of a vessel 140 towing a plurality of seismic streamers 110 according to an embodiment of the invention. The illustration in FIG. 1 is for explanatory purposes regarding the components and is not to scale. The streamers 110 (cables) include a plurality of receivers 120 (e.g., hydrophones) that receive seismic reflections resulting from one or more seismic sources 160. Although four streamers 110 are shown in FIG. 1, one or many streamers 110 may be towed behind the vessel 140. A diverter, for example, may be used to separate the streamers 110 and spread them out behind the vessel 140. The receivers 120 may be arranged at a distance d of 12.5 meters (m) from each other, for example, and this distance may be the spacing between each adjacent pair of receivers 120. One or more magnetic compasses 130 may also be arranged along the seismic streamer 110. A buoy 170 may be arranged at the opposite end of each streamer 110 from the vessel 140 and may carry additional equipment such as a gyroscope and an accelerometer, for example. The vessel 140 carries one or more controllers 150 to control and analyze data from the one or more sources 160 and sensors (e.g., receivers 120, magnetic compasses 130). The controller 150 includes an input interface 152, one or more processors 154, one or more memory devices 156, and an output interface 158.

Figure 2:
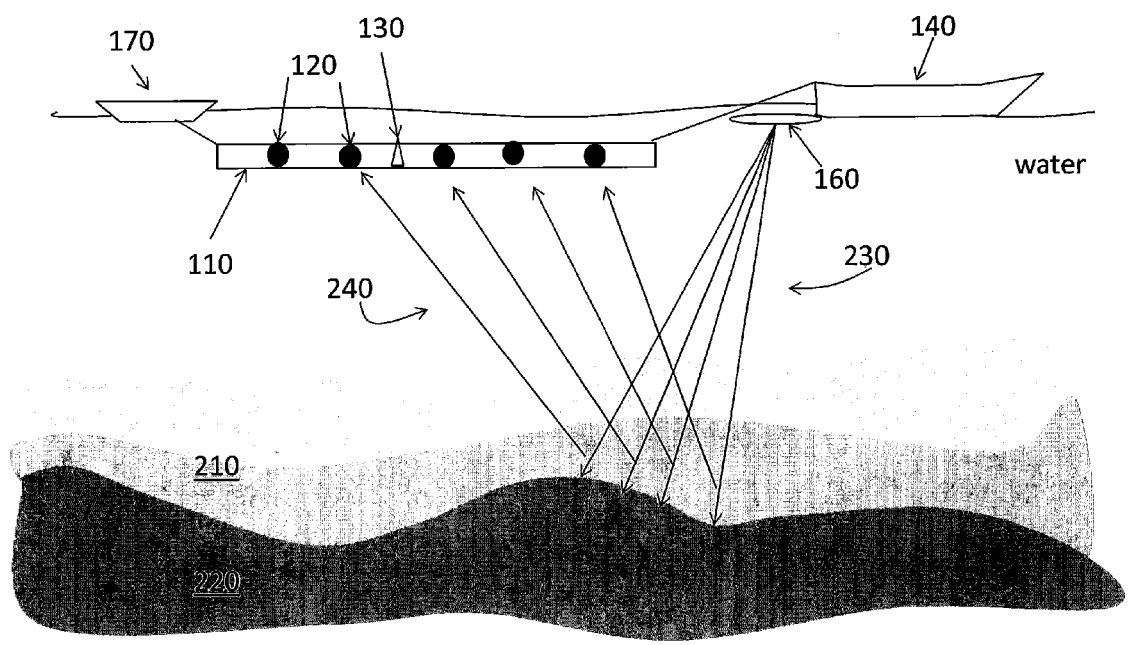
FIG. 2 is a cross-sectional side view of a seismic sampling system according to an embodiment of the invention.

FIG. 2 is a cross-sectional side view of a seismic sampling system according to an embodiment of the invention. The vessel 140 in the water and a seismic streamer 110 towed below the water surface are shown. One or more geologic layers 210 may be above a sound reflection surface 220 beneath the surface of the water. Incident signals 230 originating at one or more sources 160 are reflected, and the reflected signals 240 can be received by the receivers 120 along the seismic streamer 110. As FIG. 2 illustrates, features of the sound reflection surface 220 may be lost if the receivers 120 are too far apart. That is, if one or more of the receivers 120 shown in FIG. 2 were not operating, fewer reflections (from fewer areas of the sound reflection surface 220) would be received at the receivers 120 and, consequently, less detail would be recovered from those reflections. On the other hand, if more receivers 120 were interspersed between the receivers 120 shown in FIG. 2, each set of reflections would result in that much more data to be received, recorded, and analyzed.

Figure 3:
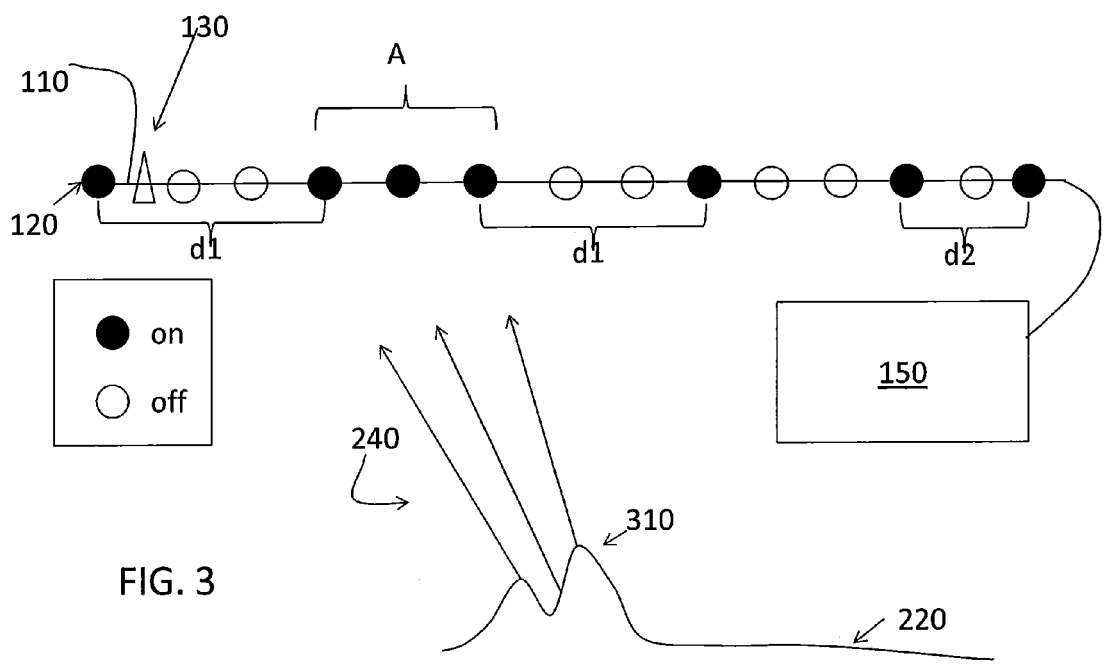
FIG. 3 illustrates a seismic streamer configured to be controlled according to embodiments of the invention.

FIG. 3 illustrates a seismic streamer 110 configured to be controlled according to embodiments of the invention. The controller 150 shown on the vessel in FIG. 1 is discussed as the exemplary controller of the seismic streamer 110 for explanatory purposes, but each seismic streamer 110 may be controlled by a separate controller which may be located along the seismic streamer 110, on the buoy 170, or elsewhere in alternate embodiments. The exemplary seismic streamer 110 shown in FIG. 3 includes a magnetic compass 130 and receivers 120 that may be arranged 1 meter (m) apart, for example. This physical spacing represents the minimum spacing (maximum spacing density) that is possible for the seismic streamer 110. The controller 150 controls some of the receivers 120 to be on and some of the receivers 120 to be off. FIG. 3 illustrates an area (A) of the seismic streamer 110 with all of the receivers 120 turned on by the controller 150. This area A of the seismic streamer 110 may correspond with reflected signals 240 from a subsurface feature or topography of interest 310, for example. The area A (the corresponding geology or topography of interest) may be identified based on forward modeling or acoustic modeling, for example, but is not limited to any particular basis for identification. The modeling output may be regarded as a trigger for dynamically controlling the sampling density. By dynamically controlling data collection from some of the receivers 120 to be on while other receivers are off, the controller 150 facilitates higher sampling density of geology and the topography of interest 310 (i.e., the topography that reflects signals received by the receivers 120 in area A) while preventing an increase in data volume from areas that are of less interest.

As FIG. 3 indicates, the control of the receivers 120 may be truly dynamic rather than a selection of a preset pattern. That is, uniform spacing is not required between one or more receivers 120 that are on and one or more receivers 120 that are off. Thus, the distance d1 (between two successive receivers 120 that are on) and the distance d2 (between two successive receivers 120 that are on) need not be the same, for example. Further, over the length of the seismic streamer 110, if two different areas of receivers 120 encounter topologies of interest (e.g., 310), then the controller 150 may create two (or more) different areas of high density sampling (two different areas such as area A over the length of the seismic streamer 110), for example. In alternate embodiments, the area A with dense seismic sampling may move (different set of receivers 120 make up the area A shown in FIG. 3) as the seismic streamer 110 moves past the topography of interest 310. The controller 150 may return the receivers 120 to a default setting after a particular condition. The default setting may be every other receiver 120 being turned on or every third receiver 120 being turned on, for example. The condition (second trigger) for returning the receivers 120 to the default setting may be a period of time or an input indicating that the topological features of interest have been passed by the moving seismic streamer 110. Receivers 120 of each of the other seismic streamers 110 may be controlled differently than the seismic streamer 110 shown in FIG. 3 based on their relative position to the topography of interest 310 or their proximity to another feature of interest.

As noted above, the dynamic selection of which receivers 120 should stay on (record reflected seismic samples) and which receivers 120 should stay off at a given time provides two distinct advantages. Firstly, the dynamic selection facilitates higher resolution sampling of regions of interest. These regions may be of interest based on their geology or topography, for example. Secondly, the dynamic selection mitigates the problem of receiving too high a volume of data by turning off the receivers 120 that provide information that may ultimately be filtered out, for example. This also overcomes the bandwidth limitations of the main backbone cable for the data transmissions.

Figure 4:
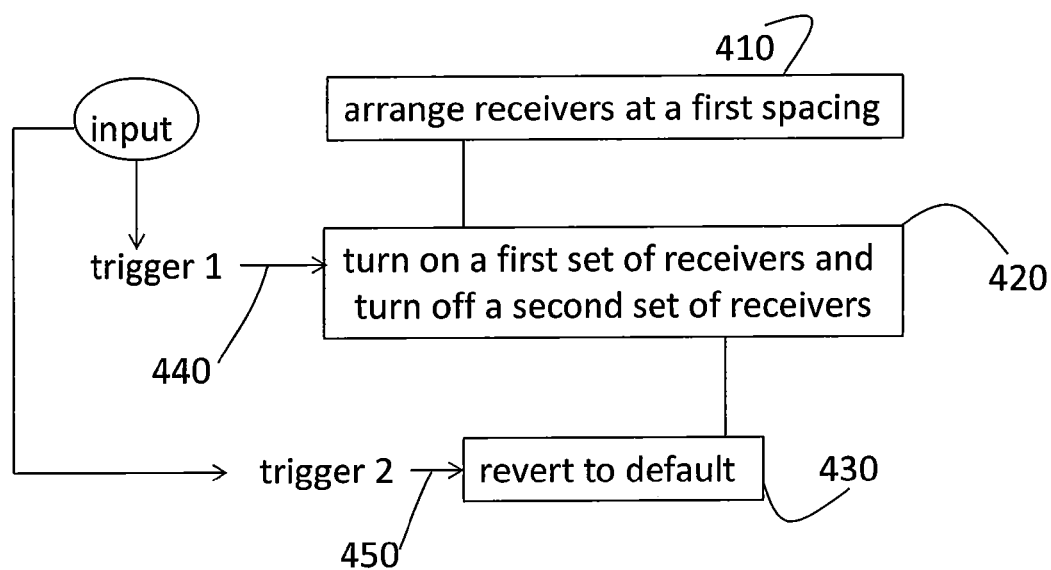
FIG. 4 is a process flow diagram of a method of dynamically adjusting seismic sample spacing within a seismic streamer according to an embodiment of the invention.

FIG. 4 is a process flow diagram of a method of dynamically adjusting seismic sample spacing within a seismic streamer 110 according to an embodiment of the invention. At block 410, arranging the receivers 120 at a first spacing includes arranging the receivers 120 at the most dense sample spacing that may be needed. This is because the physical arrangement of the receivers 120 represents a hard limit on how closely spaced the seismic sampling can be performed. Based on input (e.g., forward modeling, acoustic modeling), a first trigger may be provided (440) to the controller 150 that results in turning on a first set of the receivers 120 and turning off a second set of the receivers 120 at block 420, as shown in FIG. 3, for example. As noted above, the turning on and turning off receivers 120 (block 420) may be a process that moves along the seismic streamer 110 as the seismic streamer 110 moves over topography of interest 310.

According to one embodiment, the first trigger may be based on a selection of the reconstruction algorithm that will be used to reconstruct the geology of the area based on the seismic signals. That is, based on the particular purpose of the seismic data gathering project and the area in which the streamers 110 are deployed, a particular reconstruction algorithm may need to be determined first. The determination of the reconstruction algorithm may be based on modeling, trials, or a combination. Once the reconstruction algorithm is chosen, the sampling scheme (which receivers 120 to turn on and off, the sampling rate, and other factors affecting the data collected) may be determined based on trials, for example. This determination of the appropriate sampling scheme for the reconstruction algorithm may be the first trigger (trigger 1) provided to the controller 150. According to another embodiment, the implementation of compressive seismic imaging (CSI), which uses randomized subsampling, may act as the first trigger specifying the subset of receivers 120 to keep on.

At block 430, reverting to a default setting for the receivers 120 may be done based on a second trigger being provided 450. The second trigger may be a duration of time or may be based on an input (e.g., forward modeling, acoustic modeling) indicating that the topography of interest 310 is no longer in a relative position to the seismic streamer 110 to reflect source signals for reception by the receivers 120, for example.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

What is claimed is:

1. A method of obtaining seismic measurements of an area of interest, the method comprising:
    disposing a cable in a marine environment, the cable configured to be towed by a vessel;
    disposing a plurality of sensors at a first interval along the cable, the plurality of sensors configured to receive reflections resulting from a seismic source and each of the plurality of sensors configured to receive the reflection corresponding with a particular subsurface location; and
    controlling the plurality of sensors to dynamically turn on a first set of the plurality of sensors and dynamically turn off a second set of the plurality of sensors wherein the controlling the plurality of sensors is based on topology or geology of the area of interest.

2. The method according to claim 1, wherein the disposing the plurality of sensors includes disposing a plurality of hydrophones.

3. The method according to claim 1, further comprising locating the seismic source at the vessel.

4. The method according to claim 1, wherein the controlling the plurality of sensors includes at least one of the first set of the plurality of sensors being disposed between two of the second set of the plurality of sensors.

5. The method according to claim 1, wherein the controlling the plurality of sensors includes two or more of the first set of the plurality of sensors corresponding with the area of interest being more closely spaced than others of the first set of the plurality of sensors corresponding with other areas outside the area of interest.

6. The method according to claim 1, further comprising determining the area of interest based on results of forward modeling to determine a general response of the plurality of sensors.

7. The method according to claim 1, further comprising determining the area of interest based on results of acoustic modeling.

8. The method according to claim 7, wherein the determining the area of interest includes determining a geology of interest or a topography of interest.

9. The method according to claim 1, wherein the controlling the plurality of sensors includes a spacing between a first adjacent pair of the first set of the plurality of sensors being different than a spacing between a second adjacent pair of the first set of the plurality of sensors.

* * * * *